US007714634B2

(12) United States Patent
Yang

(10) Patent No.: US 7,714,634 B2
(45) Date of Patent: May 11, 2010

(54) PSEUDO-DIFFERENTIAL ACTIVE RC INTEGRATOR

(75) Inventor: Wenhua Yang, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 29 days.

(21) Appl. No.: 12/011,787

(22) Filed: Jan. 30, 2008

(65) Prior Publication Data

US 2009/0189672 A1 Jul. 30, 2009

(51) Int. Cl.
*G06F 7/64* (2006.01)

(52) U.S. Cl. ...................................... 327/344; 327/345

(58) Field of Classification Search ................. 327/344, 327/345

See application file for complete search history.

(56) References Cited

U.S. PATENT DOCUMENTS 4,996,498 A * 2/1991 Hanna ........................ 330/258
6,346,856 B1 * 2/2002 Myers et al. ................ 330/252
6,570,432 B2 * 5/2003 Denison ..................... 327/344
6,636,098 B1 * 10/2003 Kizer ......................... 327/345

OTHER PUBLICATIONS

Banu, M., et al., "Fully Differential Operational Amplifiers with Accurate Output Balancing," *IEEE Journal of Solid-State Circuits*, 23:6, 1410-1414 (1998).

Chiu, Y., et al., "A 14-b 12-MS/s CMOS Pipeline ADC With Over 100-db SFDR," *IEEE Journal of Solid-State Circuits*, 39:12, 2139-2151 (2004).

Ueno, T. and Itakura, T., "A 0.9V 1.5mW Continuous-Time ΔΣ Modulator for WCDMA," *IEEE International. Solid-State Circuits Conference* (2004).

* cited by examiner

*Primary Examiner*—Kenneth B. Wells
(74) *Attorney, Agent, or Firm*—Kenyon & Kenyon LLP

(57) ABSTRACT

A pseudo-differential active RC integrator is described. The pseudo-differential active RC integrator includes a common-mode feedback sub-circuit to control the common-mode output signal of the integrator. The common-mode feedback subcircuit may be coupled to one or more virtual ground nodes of the pseudo-differential active RC integrator, and may include one or more transconductors.

18 Claims, 9 Drawing Sheets

700

800a

PSEUDO-DIFFERENTIAL ACTIVE RC INTEGRATOR

BACKGROUND

1. Field of Invention

The technology described relates to integrators and methods of operation of the same.

2. Discussion of Related Art

Integrators are commonly used in various types of circuits. Timing circuits, charge measurement circuits, and signal processing circuits all may implement one or more integrators. A specific example of a circuit which may implement an integrator is a Sigma Delta Modulator circuit. The Sigma Delta Modulator may include a filter, which can be formed using one or more integrators in an appropriate configuration.

Integrators can take a variety of forms depending on the environment in which they are used and the desired operating characteristics. When selecting or designing an integrator for a particular application, a circuit designer may consider factors such as power consumption, linearity, size, ease of processing, and compatibility with surrounding circuitry. Thus, while a given integrator design may be beneficial in some settings, it may have significant drawbacks in other settings.

One example of a known integrator design is the fully-differential integrator. FIGS. 1A and 1B illustrate an example of an inverting fully-differential active RC integrator 100, shown in schematic and a more detailed representation, respectively. As shown in FIG. 1A, the fully-differential integrator 100 is configured to receive a differential input signal having positive and negative components $V_{in+}$ and $V_{in-}$, and output a differential output signal having positive and negative components $V_{out+}$ and $V_{out-}$. The fully-differential integrator 100 includes an amplifier circuit 102 which has two input terminals, one configured to receive each of the components of the differential input signal $V_{in}$. The two components of the differential input signal $V_{in}$ may be provided to the amplifier 102 via respective resistors, $R_1$ and $R_2$. The amplifier provides the differential output signal $V_{out}$ from two output terminals. Feedback paths are included in the circuit design, and include respective capacitances, illustrated as capacitors, $C_1$ and $C_2$. The fully-differential integrator 100 is referred to as an active RC integrator because of the presence of the resistors coupled with the capacitors, and the use of amplifier 102.

FIG. 1B shows the fully-differential active RC integrator of FIG. 1A in greater detail, and in particular expands on the detail of the amplifier 102 from FIG. 1A. As shown in FIG. 1B, the amplifier 102 can be viewed as having two substantially identical branches coupled together at a tail current source $I_3$. A first branch of the amplifier 102 includes current source $I_1$ coupled to NMOS transistor 104*a*. The current source $I_1$ is coupled between a supply voltage level $V_{dd1}$ and the drain of NMOS transistor 104*a*. The drain of NMOS transistor 104*a* is also coupled to capacitor $C_2$, and is the point of the circuit from which the output $V_{out-}$ is taken.

Similarly, a second branch of the amplifier includes current source $I_2$ coupled to NMOS transistor 104*b*. The current source $I_2$ is coupled between a supply voltage level $V_{dd2}$, which may be the same as $V_{dd1}$, and a drain of NMOS transistor 104*b*. The drain of NMOS transistor 104*b* is also coupled to capacitor $C_1$, and is the point of the circuit from which the output $V_{out+}$ is taken.

As shown, the first and second branches of the amplifier join at a tail current source $I_3$, which could be a transistor. In particular, the source terminals of NMOS transistors 104*a* and 104*b* are coupled to tail current source $I_3$. The tail current source $I_3$ is also coupled to ground. The combination of current sources $I_1$-$I_3$ and the two NMOS transistors 104*a* and 104*b* constitute an operational transconductance amplifier (OTA), outlined by box 102.

Another example of a known integrator design is illustrated in FIG. 2. The pseudo-differential active RC integrator 200 is similar to the fully-differential active RC integrator 100 of FIG. 1B, except that the tail current source $I_3$ in FIG. 1B is removed. The source terminals of NMOS transistors 204*a* and 204*b* are therefore coupled directly to ground. Since the input common-mode may not coincide with the gate to source voltage, $V_{gs}$, of transistors 204*a* and 204*b*, the pseudo-differential active RC integrator also includes current sources $I_4$ and $I_5$ to provide level shifting. Current sources $I_4$ and $I_5$ can be implemented as transistors. The current sources $I_4$ and $I_5$ are coupled between respective virtual ground nodes, 211*a* and 211*b* (corresponding to the gate terminals of transistors 204*a* and 204*b*) and ground.

SUMMARY

According to an aspect of the invention, a pseudo-differential active RC integrator with common-mode feedback comprises a first branch configured to receive a first component of a differential input signal and produce a first component of a differential output signal. The first branch comprises a first virtual ground node, and a first transconductor coupled to the first virtual ground node. The pseudo-differential active RC integrator with common-mode feedback further comprises a second branch configured to receive a second component of the differential input signal and produce a second component of the differential output signal. The second branch comprises a second virtual ground node, and a second transconductor coupled to the second virtual ground node. The pseudo-differential active RC integrator with common-mode feedback further comprises a common-mode feedback subcircuit coupled to the first transconductor and the second transconductor and configured to adjust a common-mode output signal of the pseudo-differential active RC integrator.

According to another aspect of the invention, a pseudo-differential active RC integrator with common-mode feedback is disclosed. The pseudo differential active RC integrator comprises a first branch configured to receive a first component of a differential input signal and produce a first component of a differential output signal. The first branch comprises a first virtual ground node, a first transconductor coupled to the first virtual ground node, a first resistor, and a first transistor. The first transistor comprises a first terminal configured to receive the first component of the differential input signal via the first resistor, the first terminal of the first transistor defining the first virtual ground node, and a second terminal configured to produce the first component of the differential output signal. The pseudo-differential active RC integrator further comprises a second branch configured to receive a second component of the differential input signal and produce a second component of the differential output signal. The second branch comprises a second virtual ground node, a second transconductor coupled to the second virtual ground node, a second resistor, and a second transistor. The second transistor comprises a first terminal configured to receive the second component of the differential input signal via the second resistor, the first terminal of the second transistor defining the second virtual ground node, and a second terminal configured to produce the second component of the differential output signal. The pseudo-differential active RC integrator further comprises a common-mode feedback subcircuit comprising a first gain stage having an output coupled to the first transconductor, and a second gain stage having an output coupled to the second transconductor.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As mentioned, any given integrator design results in operating characteristics of that integrator which may be unsatisfactory for some applications. Fully-differential active RC integrators are no exception, and include multiple operating characteristics which may make them unsatisfactory for some applications. In particular, conventional fully-differential active RC integrators, such as integrator 100, demonstrate limited output voltage swing, as well as non-linear behavior, both of which may hinder performance.

Figure 1B:
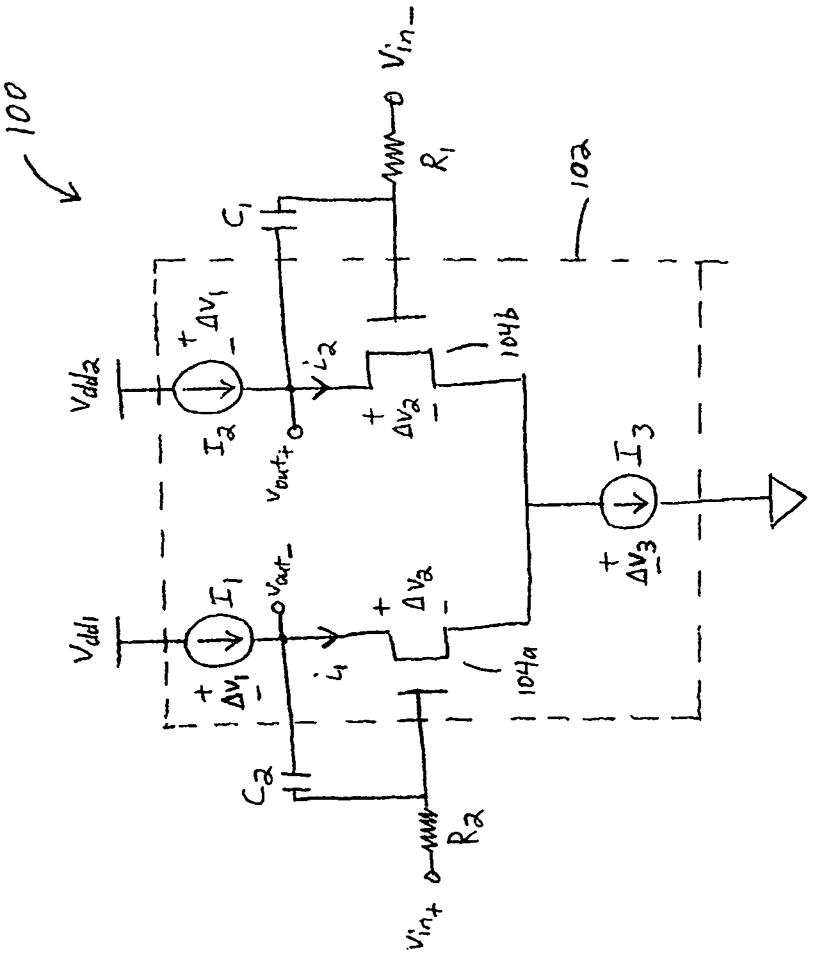
FIG. 1B Prior Art
FIG. 1B is a more detailed illustration of the circuit shown in FIG. 1A.
Figure 1A:
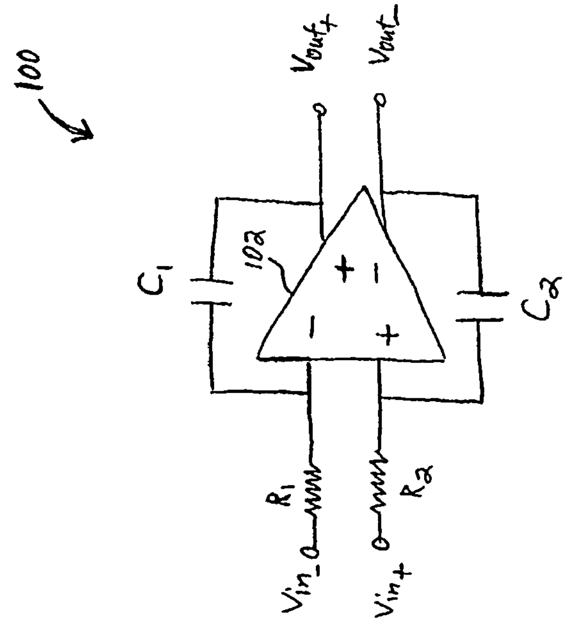
FIG. 1A Prior Art
FIG. 1A is a high level representation of a conventional inverting fully-differential active RC integrator.

The limited output voltage swing of fully-differential active RC integrators can be understood by reference to FIG. 1B. As shown, each branch of the amplifier circuit 102 includes three voltage drops, listed as $\Delta v_1$, $\Delta v_2$, and $\Delta v_3$. In particular, $\Delta v_1$ represents the voltage drops across current sources $I_1$ and $I_2$, which are presumed to be approximately equal. The transistors 104*a* and 104*b* give rise to voltage drops $\Delta v_2$, which are also presumed to be approximately equal. The tail current source $I_3$ causes the voltage drop $\Delta v_3$. Each of the three voltage drops per branch has the effect of limiting the output voltage swing of the differential output signal components $V_{out+}$ and $V_{out-}$ by either raising the minimum possible voltage for the output signals or lowering the maximum possible voltage for the output signals. The impact can be appreciated by considering some exemplary numbers. For example, the integrator 100 may be implemented using a 1.6 Volt supply. If the voltage drops $\Delta v_1$, $\Delta v_2$, and $\Delta v_3$ are each approximately 0.2 Volts, as an example, the output voltage swing will be reduced by approximately 0.6 Volts. As will be described below, a pseudo-differential active RC integrator may have a smaller reduction (e.g., approximately only a 0.4 Volt reduction as compared to 0.6 Volts) in the possible voltage swing of the differential output signal since the tail current source $I_3$, and its associated voltage drop, are removed in the pseudo-differential design.

Figure 3:
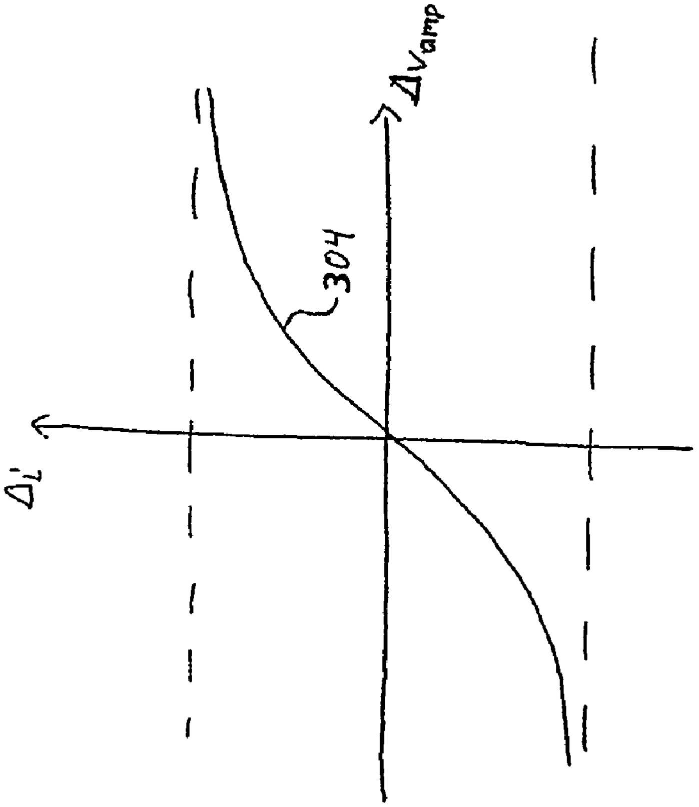
FIG. 3 Prior Art
FIG. 3 is a graphical representation of the non-linear operation of the circuits illustrated in FIGS. 1A and 1B.

As mentioned above, fully-differential active RC integrators also suffer from non-linear operation, and more particularly from a non-linear transconductance, which can be understood by reference to FIGS. 1B and 3. As shown in FIG. 1B, the two branches of the amplifier 102 carry respective currents, $i_1$ and $i_2$. The relationship between the two currents can be characterized by the quantity $\Delta i=(i_1-i_2)/2$. The value of $\Delta i$ depends on the difference between the two components of the input to the OTA 102 (not shown), which can be written as $\Delta v_{amp}$. It may be desirable for $\Delta i$ to be linearly related to $\Delta v_{amp}$, or in other words for the circuit to have a linear transconductance. However, as shown in FIG. 3, fully-differential active RC integrators do not provide a linear relationship between these two quantities. Rather, curve 304 represents the relationship of $\Delta i$ as a function of $\Delta v_{amp}$, and demonstrates that the fully-differential active RC integrator has a strong third-order non-linearity which may have undesirable effects, such as increasing the noise and distortion of the circuit.

The pseudo-differential active RC integrator 200 offers improvements over the operation of a fully-differential active RC integrator. First, removal of the tail current source $I_3$ and its associated voltage drop $\Delta v_3$, shown in FIG. 1B, gives the pseudo-differential active RC integrator 200 a larger output voltage swing than the fully-differential active RC integrator 100. Second, because each branch of the pseudo-differential active RC integrator has mostly second-order non-linearity that cancels out pseudo-differentially, the pseudo-differential active RC integrator has improved linear transconductance behavior, as compared to the strongly non-linear transconductance of the fully-differential version. The improved linear transconductance behavior offers such as reduced circuit noise and distortion.

Figure 2:
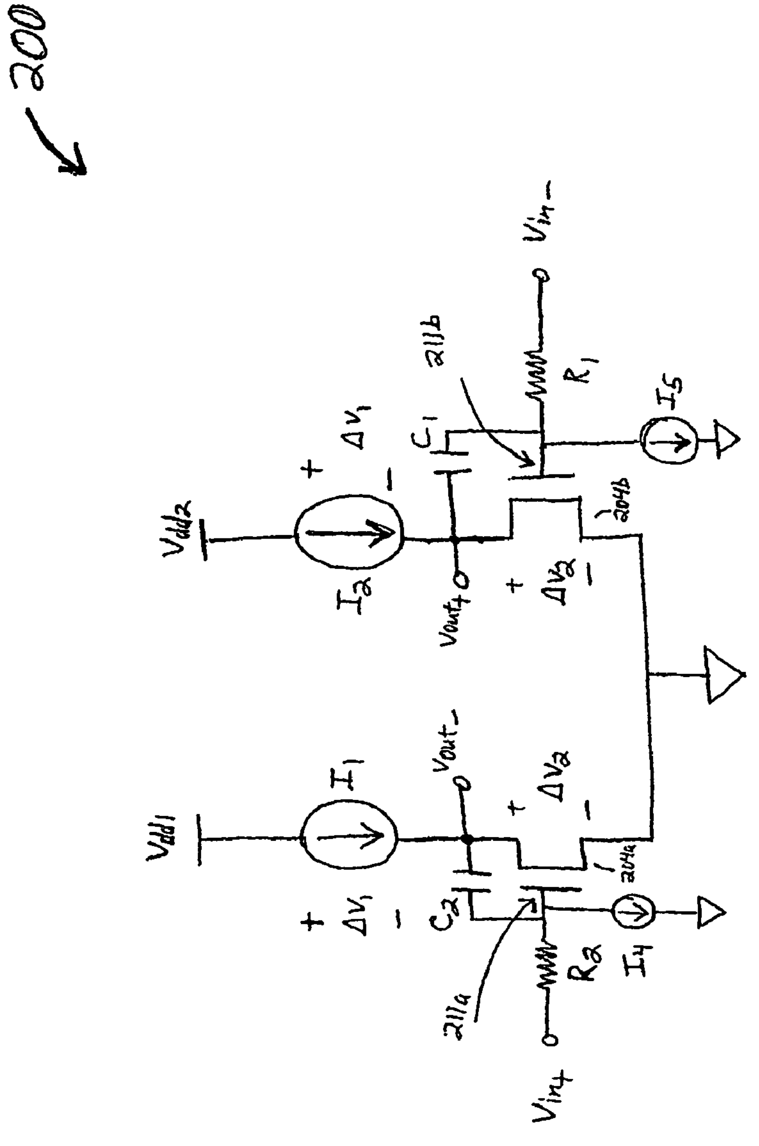
FIG. 2 Prior Art
FIG. 2 is an illustration of a conventional pseudo-differential active RC integrator.
Figure 4:
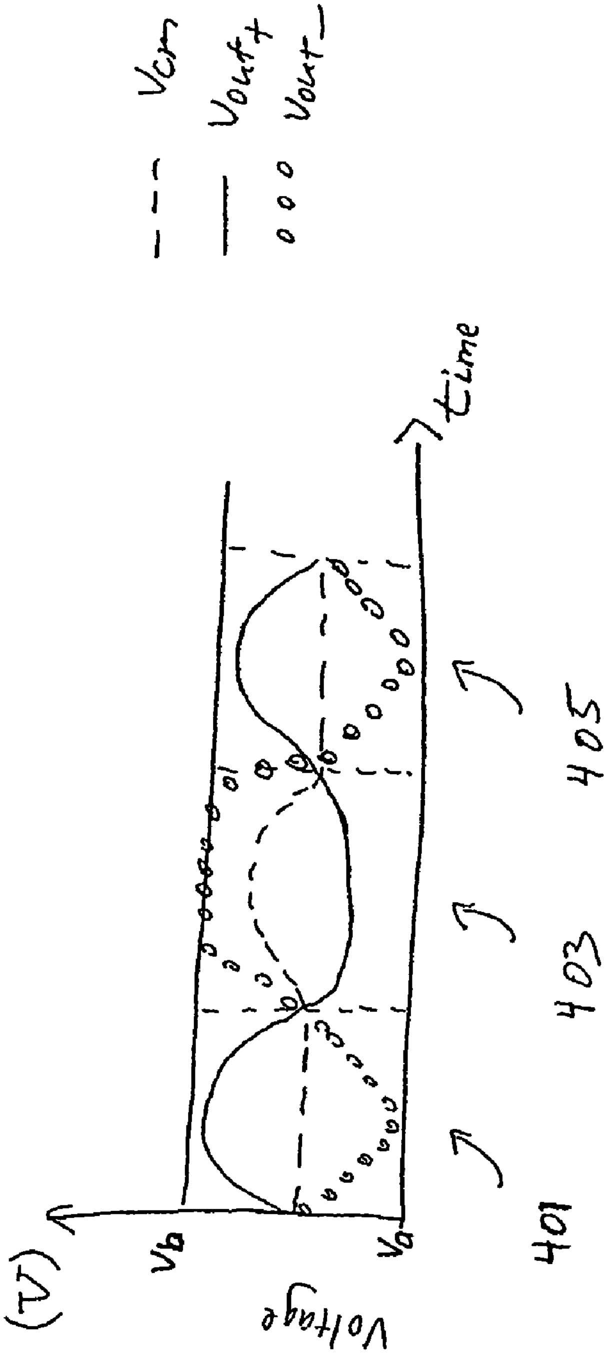
FIG. 4 Prior Art
FIG. 4 is a graphical representation of headroom problems associated with some conventional integrators.

Another characteristic of pseudo-differential active RC integrators to consider is the common-mode signal of the circuit. The common-mode signal of a circuit, such as that shown in FIG. 2, is the average of the components of a differential signal. Poor control of the common-mode signal is sometimes associated with headroom problems. FIG. 4 offers an illustration of the basic concept. FIG. 4 illustrates the positive and negative components of a differential output signal, $V_{out+}$ and $V_{out-}$, as well as a common-mode signal $V_{cm}=(V_{out+}+V_{out-})/2$, as a function of time for three regions of interest, 401, 403, and 405. The differential signal (i.e., the components $V_{out+}$ and $V_{out-}$) is shown as a sinusoidal signal, and could correspond to an output of a pseudo-differential active RC integrator. The minimum value the signals can take may be limited to a lower boundary voltage $V_a$, the value of which could be determined by the properties of the circuit. For example, referring to FIG. 1B and the example of a fully-differential integrator, the value of $V_a$ may be determined in whole or in part by the voltage drops $\Delta v_1$, $\Delta v_2$, and $\Delta v_3$. For example, $V_a$ may be equal to $\Delta v_2+\Delta v_3$. Similarly, the maximum value the signals in FIG. 4 can take may be limited by an upper boundary voltage $V_b$, which, referring to FIG. 1B and the example of a fully-differential integrator, may be equal to $V_{dd1}-\Delta v_1$.

As shown, in regions 401 and 405, the common-mode voltage $V_{cm}$ is approximately equidistant between the lower and upper boundary voltages $V_a$ and $V_b$, which allows signals $V_{out+}$ and $V_{out-}$ to oscillate within the entire voltage range from $V_a$ to $V_b$. By contrast, region 403 illustrates a headroom problem that can lead to erroneous circuit operation. In particular, in region 403 the common-mode voltage $V_{cm}$ drifts toward the upper boundary voltage $V_b$, and as shown $V_{out-}$ is clipped by the upper boundary voltage $V_b$, such that $V_{out+}$ and $V_{out-}$ do not oscillate within the entire range from $V_a$ to $V_b$. Behavior such as that shown in region 403 can impair accurate circuit operation, and therefore it is desirable to accurately control the common-mode voltage of differential circuits, such as pseudo-differential active RC integrators.

According to an aspect of the present invention, a pseudo-differential active RC integrator having common-mode feedback is disclosed. The common-mode feedback component of the circuit provides accurate control of a common-mode signal and therefore makes the circuit operation stable. Various modifications can also be made to the basic circuit design to provide additional functionality, such as the ability to reset each of the differential output signals to a common-mode value, as well as enhancing the DC gain of the integrator. Additional features and benefits will be appreciated in the following discussion.

Figure 5:
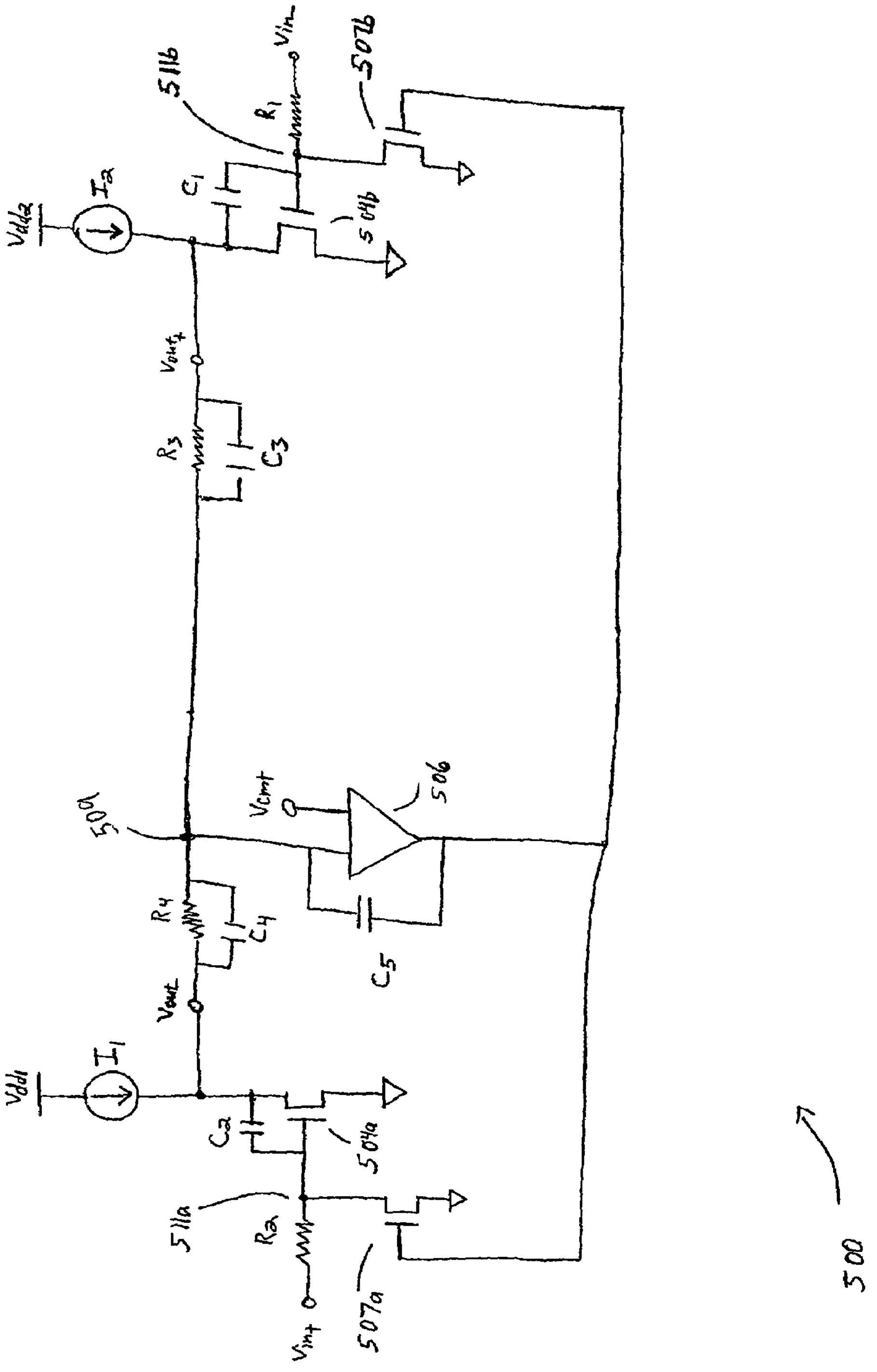
FIG. 5 illustrates a pseudo-differential active RC integrator with common-mode feedback according to an embodiment of the present invention.

FIG. 5 illustrates one example of a pseudo-differential active RC integrator with common-mode feedback according to an embodiment of the present invention. As shown, the pseudo-differential active RC integrator 500 comprises two branches configured approximately symmetrically about gain stage 506 and capacitor $C_5$, discussed further below. A first branch of the pseudo-differential active RC integrator 500 includes current source $I_1$ coupled to NMOS transistor 504*a*. The current source $I_1$ is coupled between a supply voltage level $V_{dd1}$ and the drain of NMOS transistor 504*a*. The drain of NMOS transistor 504*a* is also coupled to capacitor $C_2$, and is the point of the circuit from which the negative component, $V_{out-}$, of the differential output signal is provided. It will be appreciated that the output signal $V_{out-}$ could be provided directly from the drain of NMOS transistor 504*a* (as shown) or could be coupled to the drain of NMOS transistor 504*a* through one or more additional components. For example, a cascode configuration could be used to convert the signal from the drain of 504*a* to the desired output signal. Thus, it will be appreciated that the terms "couple," "coupled," "coupling," and any variations thereof as used in this application encompass direct or indirect (i.e., through one or more components) connections. Similarly, a circuit or component described as "providing," or "producing" a signal is meant to encompass direct provision or production of that signal as well as provision or production of the signal through one or more additional circuits or components. The positive component $V_{in+}$ of the differential input signal is input to the gate terminal of NMOS transistor 504*a* via resistor $R_2$.

The first branch further comprises a transconductor 507*a*, having a transconductance $g_m$ coupled to the virtual ground node 511*a*. The transconductor 507*a* is illustrated as an NMOS transistor, but is not limited in this respect, as any type of transconductor could be used. For example, the transconductor 507*a* could be a PMOS transistor, a bipolar junction transistor (BJT), or any other type of transconductor. Node 511*a* represents a virtual ground node, and corresponds in the illustrated embodiment to the gate terminal of NMOS transistor 504*a*. The virtual ground node 511*a* may have an approximately constant voltage having a value sufficient to keep a current through transistor 504*a* approximately equal to $I_1$.

The second branch of the integrator 500 is substantially the same in design and operation as the first branch, and represents the negative input, $V_{in-}$, branch. For example, the following components may be substantially the same as each other in configuration and operation: supply voltage levels $V_{dd1}$ and $V_{dd2}$ (which may be the same supply voltage); current sources $I_1$ and $I_2$; capacitors $C_1$ and $C_2$; transistors 504*a* and 504*b*; resistors $R_1$ and $R_2$; and transconductors 507*a* and 507*b*.

As shown, the pseudo-differential active RC integrator 500 includes a common-mode feedback subcircuit for controlling the common-mode output signal of the integrator. The common-mode feedback subcircuit comprises a capacitor $C_5$ configured in parallel with a gain stage 506, which may be an amplifier, an OTA, or any other type of gain stage. The gain stage 506 has two inputs, one of which is coupled to receive the common-mode output signal of the integrator (node 509), and the second of which is configured to receive a reference signal representing a target value, $V_{cmt}$, for the common-mode output signal. The common-mode output signal of the integrator is provided at node 509, and is the average of the two components of the differential output signal, $V_{out+}$ and $V_{out-}$. In the non-limiting example of FIG. 5, the common-mode output signal is provided to node 509 by providing $V_{out-}$ from the drain of transistor 504*a* to node 509 through an RC subcircuit comprising resistor $R_4$ in parallel with capacitor $C_4$, while providing $V_{out+}$ from the drain of transistor 504*b* to node 509 through an RC subcircuit comprising resistor $R_3$ in parallel with capacitor $C_3$. It may be desirable for $R_3$ and $R_4$ to have large values, however, the invention is not limited in this respect.

The gain stage 506 of the common-mode feedback subcircuit may have an output coupled to the transconductors 507*a* and 507*b*, which in turn are coupled to the virtual ground nodes 511*a* and 511*b*, respectively. In the embodiment of FIG. 5, transconductors 507*a* and 507*b* are transistors, and the output of gain stage 506 is coupled to the gate terminals of the transistors. In this manner, the common-mode output signal is controlled using the transconductors 507*a* and 507*b* coupled to the virtual ground nodes, as can be understood by considering two non-limiting scenarios.

In the first scenario, the common-mode output signal, at node 509, is greater than the target value of the common-mode output signal $V_{cmt}$. Accordingly, the output of the gain stage 506 decreases, and reduces the current through transistors 507*a* and 507*b*, which causes the common-mode output signal to decrease, and drives the common-mode output signal closer to the target value $V_{cmt}$.

In the second scenario, the common-mode output signal at node 509 is less than the target value $V_{cmt}$. Accordingly, the output of the gain stage 506*a* increases, and increases the current through transistors 507*a* and 507*b*, which causes the common-mode output signal to increase, and drives the common-mode output signal closer to the target value $V_{cmt}$. Thus, as illustrated by the first and second scenarios described, the common-mode feedback subcircuit maintains the value of the common-mode output signal at approximately the target value, and thus enhances the stability of the circuit.

It will be appreciated that the groupings of components described in FIG. 5 (and other figures of this application) are meant for purposes of illustration, and are not limiting. For example, while some components in FIG. 5 are described as being part of a first or second branch of the pseudo-differential active RC integrator 500, they may alternatively be described as being part of the common-mode feedback subcircuit, and vice versa.

Capacitors $C_3$ and $C_4$ in FIG. 5 may stabilize the common-mode signal in the pseudo-differential active RC integrator 500. For example, the common-mode operation of pseudo-differential active RC integrator 500 with respect to the common-mode output signal can be analogous to a resonator circuit. Resonator circuits may produce an oscillating, or periodic, output in response to an oscillating input. As is known, one manner of characterizing resonator circuits is by their quality factor, Q, which is a measure of how fast an oscillation decays. If Q is large, the oscillation of the output signal may be accentuated, resulting in ringing of the output signal.

In the context of pseudo-differential active RC integrator 500, it may not be desirable for the common-mode output signal to fluctuate. Rather, it may be desirable for the common-mode output signal to remain approximately constant to avoid problems during circuit operation, such as headroom problems. Capacitors $C_3$ and $C_4$ in the pseudo-differential active RC integrator 500 reduce the Q of the resonator with respect to the common-mode output signal, thus providing stable control of the common-mode output signal.

The circuits illustrated and discussed thus far can be expanded upon in numerous ways to provide additional functionality. For example, it may be desirable to provide the capability to reset the common-mode output signal to a target value for one or more of the circuits shown. The common-mode output signal may drift during operation of the circuit, so that resetting the value of the common-mode output signal to a target value may enhance stable circuit operation. Other reasons for resetting the common-mode output signal to a target value are also possible, as the aspects of the invention are not limited in this respect. It may also be desirable to provide a circuit with enhanced DC gain.

Figure 6:
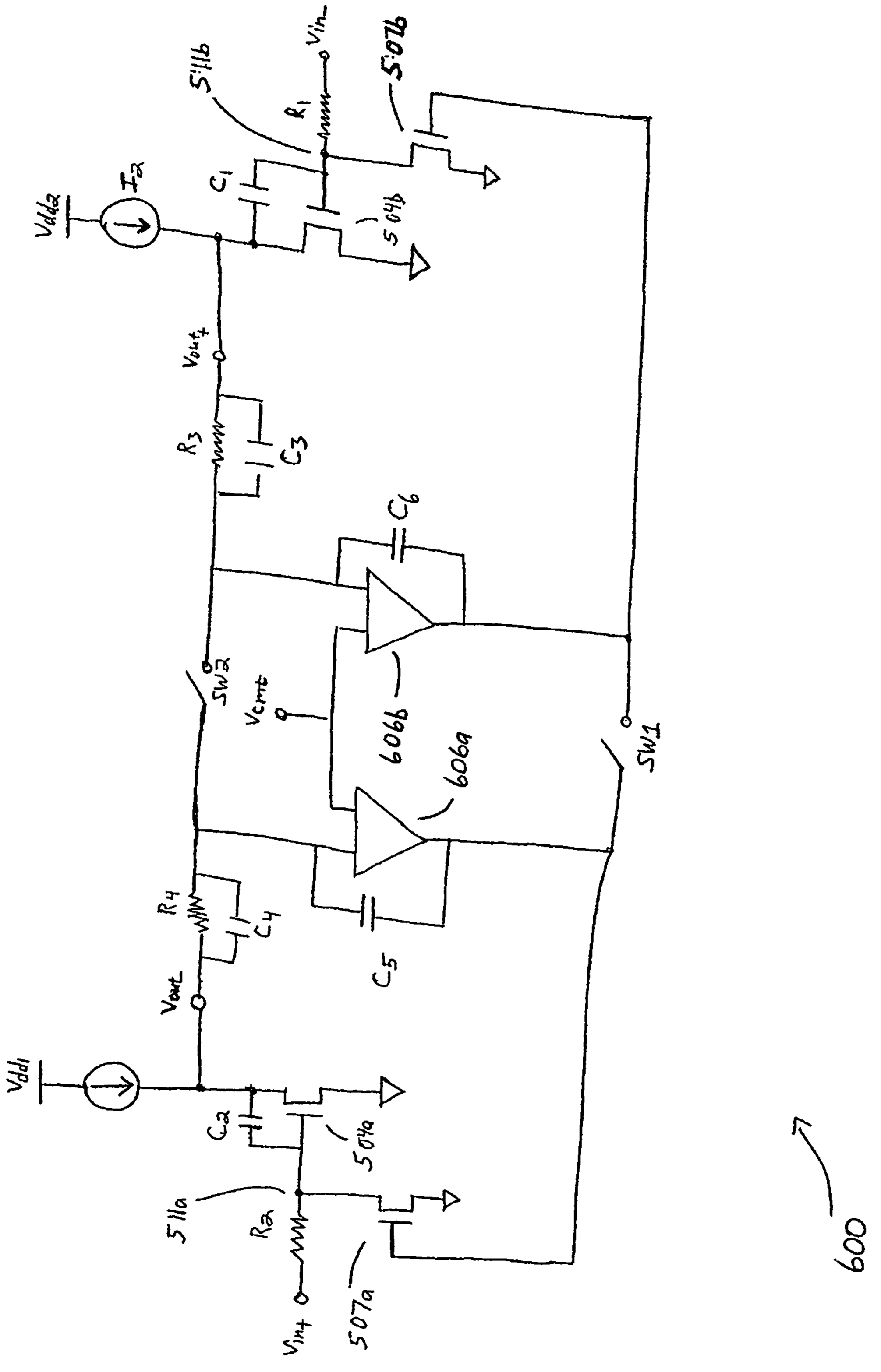
FIG. 6 illustrates a pseudo-differential active RC integrator with common-mode feedback having reset capabilities, in accordance with an embodiment of the present invention.

FIG. 6 illustrates a pseudo-differential active RC integrator having common-mode feedback and the capability to reset the common-mode output signal. It should be appreciated that the pseudo-differential active RC integrator 600 in FIG. 6 is substantially the same as pseudo-differential active RC integrator 500 in FIG. 5. For simplicity, components previously described in relation with FIG. 5 are not described in detail here. As shown, the common-mode feedback sub-circuit of pseudo-differential active RC integrator 600 comprises two gain stages 606_a_ and 606_b_, each with a respective parallel capacitor $C_5$ and $C_6$. Each gain stage 606_a_ and 606_b_ comprises an input configured to receive the target value, $V_{cmt}$, of the common-mode output signal. Each gain stage 606_a_ and 606_b_ has an output capable of being connected simultaneously to transconductors 507_a_ and 507_b_, depending on the operation of switch SW1 configured between the outputs of the two gain stages 606_a_ and 606_b_.

The inclusion of switches SW1 and SW2 in the pseudo-differential active RC integrator 600 provides the circuit with at least two distinct operating scenarios. In the first scenario, switch SW1 and switch SW2 (which replaces node 509 in FIG. 5) are closed, thus operating as short circuits. Accordingly, the two branches of the pseudo-differential active RC integrator 600 are coupled together and the integrator functions in substantially the same manner as the pseudo-differential active RC integrator 500 of FIG. 5. In this scenario, the gain stages 606_a_ and 606_b_ each comprise an input configured to receive the common-mode output signal of the integrator 600 (at the position of SW2) and provide a combined, amplified output at switch SW1, which is provided to the gates of transconductors 507_a_ and 507_b_. The values of capacitors $C_5$ and $C_6$, as well as the gain values of gain stages 606_a_ and 606_b_, may be chosen to account for the presence of the two amplifiers 606_a_ and 606_b_ (as compared to the single amplifier in the common-mode feedback subcircuit of FIG. 5), although the invention is not limited in this respect. As with the pseudo-differential active RC integrator 500 of FIG. 5, the pseudo-differential active RC integrator 600 of FIG. 6 may maintain the output common-mode signal at approximately the target value $V_{cmt}$ when switches SW1 and SW2 are closed.

In the second operating scenario for pseudo-differential active RC integrator 600, the switches SW1 and SW2 are open, thus creating two independent single-ended loops. In this scenario, gain stage 606_a_ does not receive the common-mode output signal at one of its inputs, but rather receives the output signal of the first branch (i.e., a single component of the differential output signal) of the integrator 600. The output of gain stage 606_a_ is coupled to transconductor 507_a_, but not to transconductor 507_b_. Thus, the feedback subcircuit of the first branch (comprising gain stage 606_a_ and capacitor $C_5$) drives the output signal of the first branch to the target value $V_{cmt}$. Similarly, gain stage 606_b_ does not receive the common-mode output signal at one of its inputs, but rather receives the output signal of the second branch (i.e., a single component of the differential output signal) of the integrator 600. The output of gain stage 606_b_ is coupled to transconductor 507_b_, but not transconductor 507_a_. Thus, the feedback subcircuit of the second branch (comprising gain stage 606_b_ and capacitor $C_6$) drives the output signal of the second branch to the target value $V_{cmt}$. In this manner, both components of the differential output signal are individually driven to the target value $V_{cmt}$. Thus, if and when switches SW1 and SW2 are closed, the common-mode output signal will have a value approximately equal to the target value $V_{cmt}$, and thus will have been reset.

With reference to FIG. 6, it should also be appreciated that the terminology used herein is not limiting. Accordingly, FIG. 6 could be described as comprising two common-mode feedback subcircuits, with one such subcircuit corresponding to each of the two branches of the integrator 600. However, integrator 600 could be described equally well as comprising one common-mode feedback subcircuit comprising both gain stages 606_a_ and 606_b_, and capacitors $C_5$ and $C_6$. The common-mode feedback subcircuit may contain any one or combination of components described herein, as the aspects of the invention are not limited in this respect.

Figure 7:
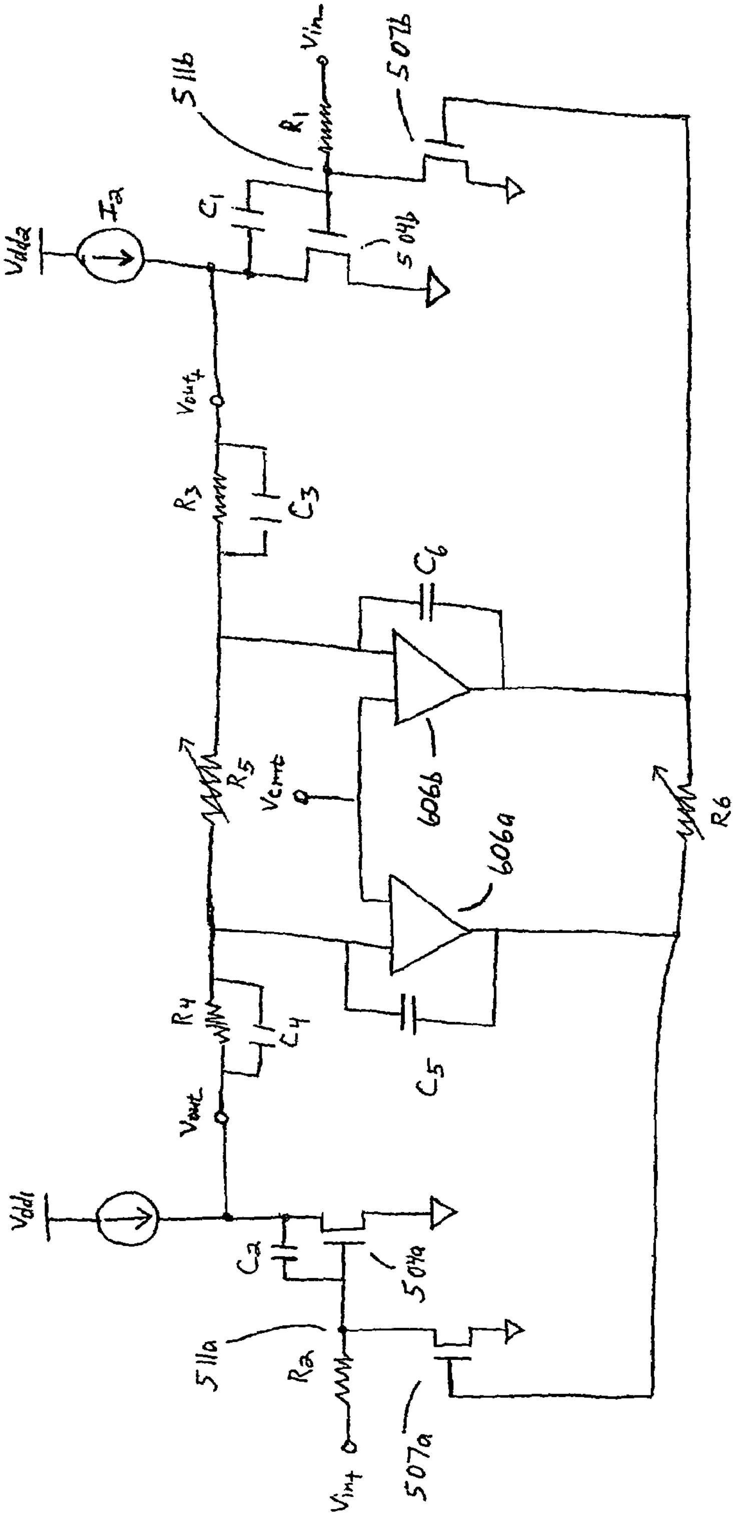
FIG. 7 illustrates a pseudo-differential active RC integrator with common-mode feedback having DC gain enhancement capabilities, in accordance with an embodiment of the present invention.

FIG. 7 illustrates a variation on the pseudo-differential active RC integrator 600 of FIG. 6 that provides enhanced DC gain. As shown, the pseudo-differential active RC integrator 700 of FIG. 7 is substantially the same as the pseudo-differential active RC integrator 600, with switches SW1 and SW2 being replaced by variable resistors $R_6$ and $R_5$, respectively. The variable resistors $R_5$ and $R_6$ provide controlled differential feedback, which may move the pole of the pseudo-differential active RC integrator 700. Proper control of the resistances of variable resistors $R_5$ and $R_6$ thus may enable the pole of the integrator 700 to be moved to the origin, such that the integrator 700 may provide an approximately infinite DC gain.

Figure 8A:
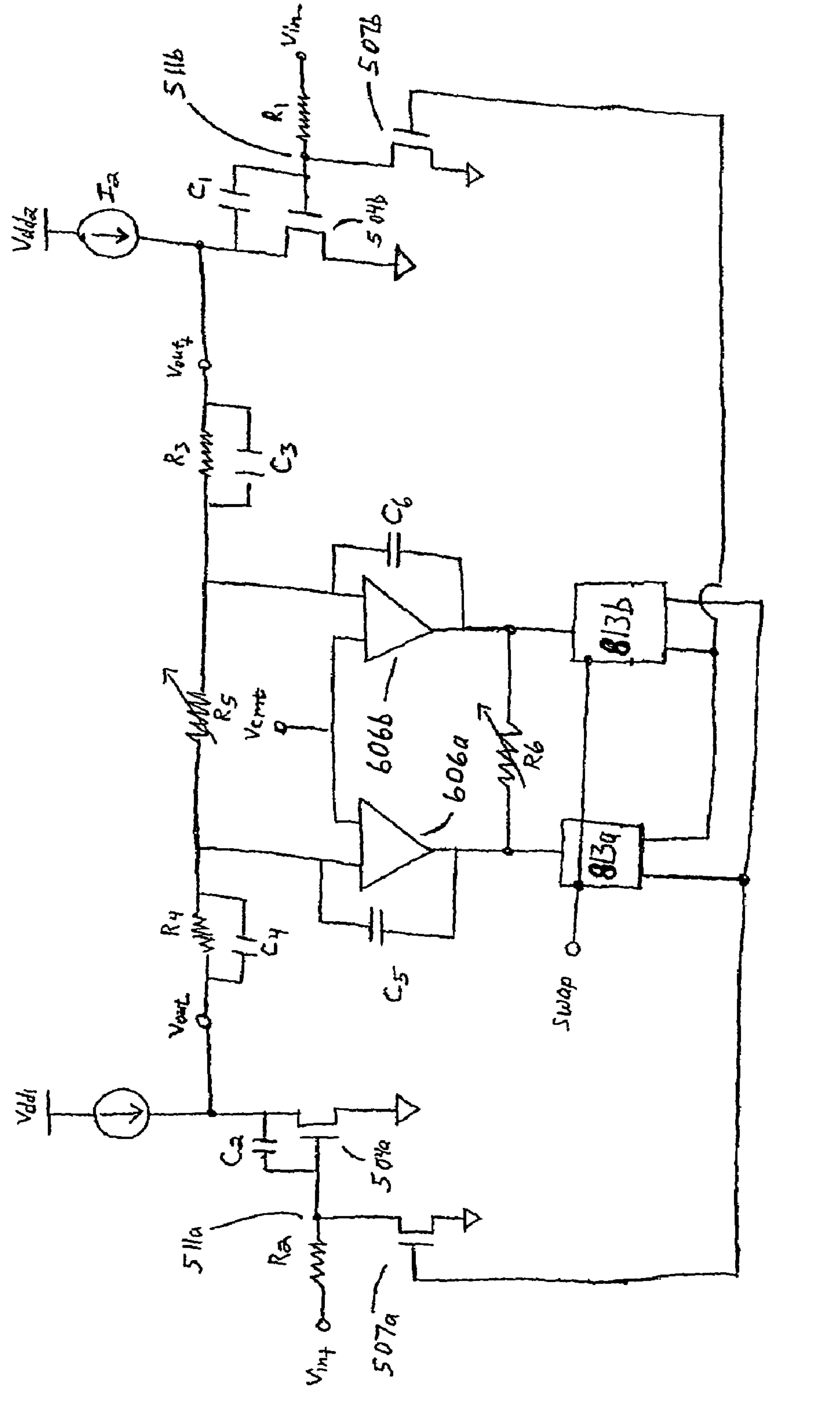
FIGS. 8A and 8B illustrate alternative embodiments of a pseudo-differential active RC integrator providing control of the polarity of common-mode feedback, according to some embodiments of the present invention.
Figure 8B:
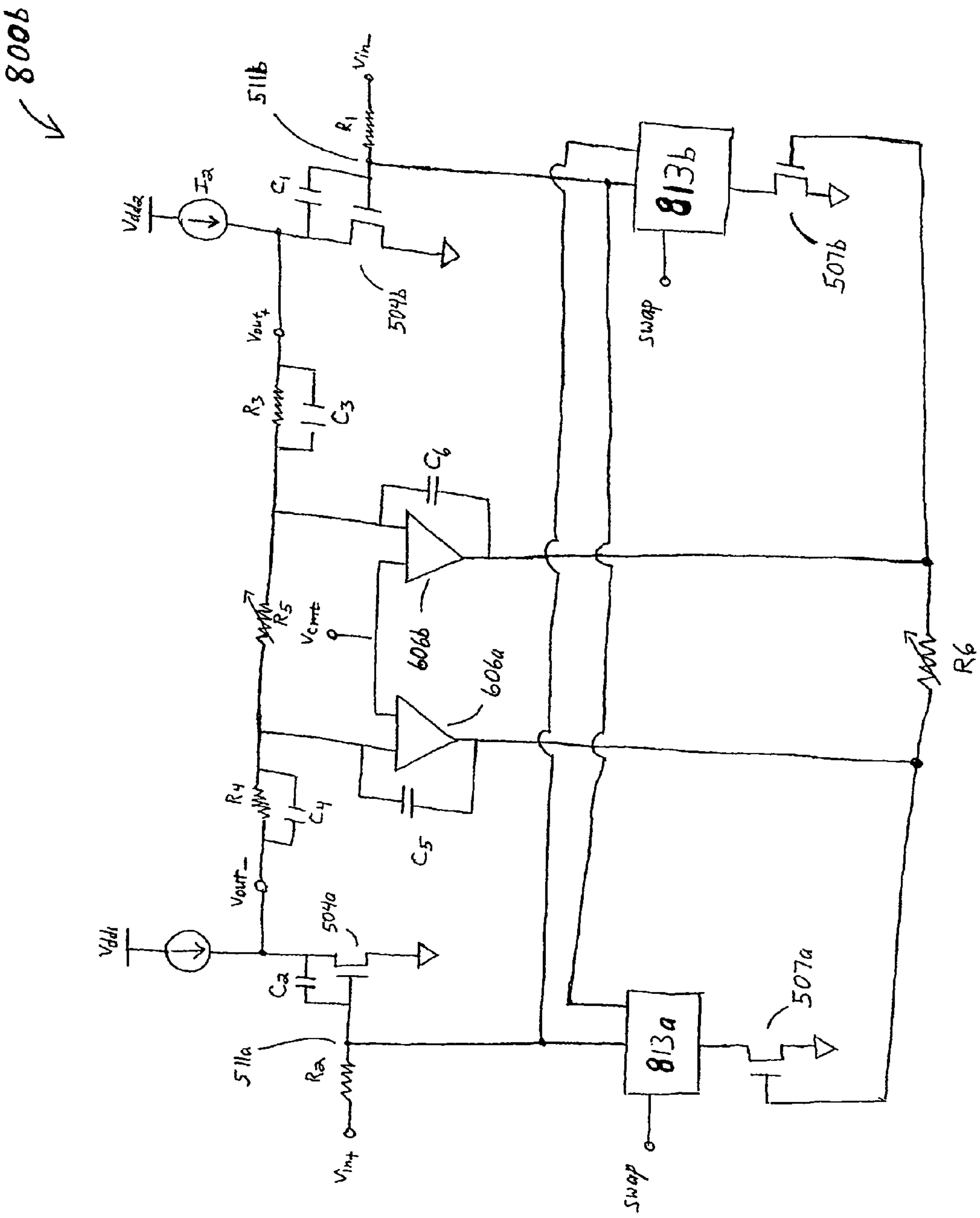

FIGS. 8A and 8B show an alternative implementation of a pseudo-differential active RC integrator with common-mode feedback, according to another aspect of the present invention. The circuits shown in FIGS. 8A and 8B enable control of the pole of the integrator. As is known, an ideal integrator has a single pole at the origin. However, in practice, integrators may have a pole that is not located at the origin, but rather is located somewhere else along the real axis. The location of the pole on the real axis may dictate the polarity of the feedback for the integrator, i.e., positive feedback or negative feedback. The circuits shown in FIGS. 8A and 8B provide alternative configurations for controlling the polarity of the common-mode feedback.

Pseudo-differential active RC integrator 800_a_ comprises two swapping circuits, 813_a_ and 813_b_, which act in combination (and could be referred to as constituting a single swapping circuit). Swapping circuit 813_a_ is configured between the output of gain stage 606_a_ and the gates of transconductors

507*a* and 507*b*, and is configured to receive an input control signal labeled as "swap." Similarly, swapping circuit 813*b* is configured between the output of gain stage 606*b* and the gates of transconductors 507*a* and 507*b*, and is configured to receive the input control signal "swap." If the pole of the integrator is such that negative feedback is desired, the swapping circuits 813*a* and 813*b* may operate, by input of an appropriate control input signal "swap," to connect the output of gain stage 606*a* to the gate of transconductor 507*b* and the output of gain stage 606*b* to the gate of transconductor 507*a*, while at the same time disconnecting the output of gain stage 606*a* from the gate of transconductor 507*a* and the output of gain stage 606*b* from the gate of transconductor 507*b*. Alternately, if the pole of the integrator is such that positive feedback is desired to move the pole closer to the origin, the swapping circuits 813*a* and 813*b* may operate, by input of an appropriate control input signal "swap," to connect the output of gain stage 606*a* to the gate of transconductor 507*a* and the output of gain stage 606*b* to the gate of transconductor 507*b*, while disconnecting the output of gain stage 606*a* from the gate of transconductor 507*b* and the output of gain stage 606*b* from the gate of transconductor 507*a*.

FIG. 8B is an alternative embodiment enabling control of the polarity of the common-mode feedback using swapping circuits 813*a* and 813*b*. The pseudo-differential active RC integrator 800*b* comprises swapping circuits 813*a* and 813*b* positioned differently from their configuration in pseudo-differential active RC integrator 800*a*. In 800*b*, swapping circuits 813*a* and 813*b* are configured between the drain of transconductor 507*a* and the drain of transconductor 507*b*, and the virtual ground nodes 511*a* and 511*b*. The swapping circuit 813*a* may operate to alternately connect the drain of transconductor 507*a* to the virtual ground nodes 511*a* and 511*b*, while swapping circuit 813*b* may operate to alternately connect the drain of transconductor 507*b* to the virtual ground nodes 511*b* and 511*a*, thus providing control of the polarity of the common-mode feedback. For example, if negative feedback is desired, swapping circuits 813*a* and 813*b* may, by input of appropriate control input signals "swap" (which may be the same for both 813*a* and 813*b*, or which may differ), connect the drain of transconductor 507*a* to virtual ground node 511*b* and the drain of transconductor 507*b* to virtual ground node 511*a*, while disconnecting the drain of transconductor 507*a* from the virtual ground node 511*a* and the drain of transconductor 507*b* from the virtual ground node 511*b*. By contrast, if positive feedback is desired, the swapping circuits 813*a* and 813*b* may operate to connect the drain of transconductor 507*a* to virtual ground node 511*a* and the drain of transconductor 507*b* to virtual ground node 511*b*, while disconnecting the drain of transconductor 507*a* from virtual ground node 511*b* and the drain of transconductor 507*b* from virtual ground node 511*a*.

As will be appreciated, the swapping circuits 813*a* and 813*b* can be implemented in any manner, and the invention is not limited in this respect. For example, the swapping circuits could be implemented as alternate switches. Other implementations of the swapping circuits are also possible.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

For example, the polarity of the circuits shown is not limiting. While some of the circuits have been shown as comprising NMOS transistors, the invention is not limited in this respect. Rather, it will be appreciated that a similar circuit design and operation could be achieved using PMOS transistors, BJTs, or any other type of transistors. Moreover, while some of the circuits shown have been inverting integrators, it will be appreciated that non-inverting integrators could also be achieved by implementing one or more aspects of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A pseudo-differential active RC integrator with common-mode feedback, comprising:

- a first branch configured to receive a first component of a differential input signal and produce a first component of a differential output signal, the first branch comprising:
  - a first resistor;
  - a first virtual ground node;
  - a first transistor including a first terminal configured to receive the first component of the differential input signal via the first resistor and including a second terminal configured to produce the first component of the differential output signal; and
  - a first transconductor coupled to the first virtual ground node;
- a second branch configured to receive a second component of the differential input signal and produce a second component of the differential output signal, the second branch comprising:
  - a second resistor;
  - a second virtual ground node;
  - a second transistor including a first terminal configured to receive the second component of the differential input signal via the second resistor and including a second terminal configured to produce the second component of the differential output signal; and
  - a second transconductor coupled to the second virtual ground node; and
- a common-mode feedback subcircuit coupled to the first transconductor and the second transconductor and configured to adjust a common-mode output signal of the pseudo-differential active RC integrator.

2. The pseudo-differential active RC integrator of claim 1, wherein the first terminal of the first transistor defines the first virtual ground node; and wherein the first terminal of the second transistor defines the second virtual ground node.

3. The pseudo-differential active RC integrator of claim 1, wherein the common-mode feedback subcircuit comprises a gain stage having an input configured to receive the common-mode output signal, and an output coupled to the first transconductor and the second transconductor.

4. The pseudo-differential active RC integrator of claim 3, wherein the gain stage comprises an operational amplifier.

5. The pseudo-differential active RC integrator of claim 3, wherein the gain stage comprises an integrator.

6. The pseudo-differential active RC integrator of claim 3, wherein the first transconductor comprises a third transistor and wherein the output of the gain stage is coupled to a gate terminal of the third transistor.

7. The pseudo-differential active RC integrator of claim 6, wherein the second transconductor comprises a fourth transistor and wherein the output of the gain stage is coupled to a gate terminal of the fourth transistor.

8. The pseudo-differential active RC integrator of claim 3, wherein the input of the gain stage is a first input, and wherein the gain stage further has a second input configured to receive a reference signal corresponding to a target value of the common-mode output signal.

9. The pseudo-differential active RC integrator of claim 3, wherein the common-mode feedback subcircuit further comprises a capacitor in parallel with the gain stage.

10. The pseudo-differential active RC integrator of claim 2, wherein the first terminal of the first transistor defining a first virtual ground node is a gate terminal.

11. The pseudo-differential active RC integrator of claim 3, wherein the gain stage input configured to receive the common-mode output signal is coupled to the second terminal of the first transistor by a third resistor and is coupled to the second terminal of the second transistor by a fourth resistor; and wherein the third resistor and the fourth resistor have approximately equal resistances.

12. The pseudo-differential active RC integrator of claim 11, further comprising a first capacitor in parallel with the third resistor and a second capacitor in parallel with the fourth resistor.

13. A pseudo-differential active RC integrator with common-mode feedback, comprising:

a first branch configured to receive a first component of a differential input signal and produce a first component of a differential output signal at a first output node, the first branch including:

a first virtual ground node; and a first transconductor coupled to the first virtual ground node;

a second branch configured to receive a second component of the differential input signal and produce a second component of the differential output signal at a second output node, the second branch including:

a second virtual ground node; and a second transconductor coupled to the second virtual ground node; and a common-mode feedback subcircuit with an output coupled to the first transconductor and the second transconductor and configured to adjust a common-mode output signal of the pseudo-differential active RC integrator, wherein the common-mode feedback subcircuit includes a reference voltage input and a second input connected to the first output node via a first resistor, the first resistor having a first capacitor connected in parallel, wherein the second input is further connected to the second output node via a second resistor, the second resistor having a second capacitor connected in parallel.

14. the pseudo-differential active RC integrator of claim 13, wherein the common-mode feedback subcircuit includes an operational amplifier (opamp).

15. the pseudo-differential active RC integrator of claim 14, wherein the common-mode feedback subcircuit includes only one opamp.

16. The pseudo-differential active RC integrator of claim 13, wherein the first branch further includes:

a first transistor comprising:

a first terminal defining the first virtual ground node; and a second terminal configured to produce the first component of the differential output signal; and wherein the second branch further includes:

a second transistor including:

a first terminal defining the second virtual ground node; and a second terminal configured to produce the second component of the differential output signal.

17. The pseudo-differential active RC integrator of claim 16, wherein the second terminal of the first transistor is connected to a first current source, and wherein the second terminal of the second transistor is connected to a second current source.

18. The pseudo-differential active RC integrator of claim 17, wherein the first virtual ground node is configured to have a substantially constant voltage having a value sufficient to keep a current through the first transistor substantially equal to the first current source, and wherein the second virtual ground node is configured to have a substantially constant voltage having a value sufficient to keep a current through the second transistor substantially equal to the second current source.

* * * * *